(12) United States Patent
Li et al.

(10) Patent No.: US 11,546,297 B2
(45) Date of Patent: Jan. 3, 2023

(54) SECURE COMMUNICATION METHOD, CLIENT AND NON-PUBLIC SERVER

(71) Applicant: Tsinghua University, Beijing (CN)

(72) Inventors: Xing Li, Beijing (CN); Congxiao Bao, Beijing (CN); Renjie Liu, Beijing (CN); Zhe Weng, Beijing (CN); Deliang Chang, Beijing (CN)

(73) Assignee: Tsinghua University, Beijing (CN)

( * ) Notice: Subject to any disclaimer, the term of this patent is extended or adjusted under 35 U.S.C. 154(b) by 144 days.

(21) Appl. No.: 17/249,401

(22) Filed: Mar. 1, 2021

(65) Prior Publication Data
US 2021/0273909 A1     Sep. 2, 2021

(30) Foreign Application Priority Data
Mar. 2, 2020   (CN) .......................... 202010137103.8

(51) Int. Cl.
| | | |
|---|---|---|
| *H04L 12/749* | (2013.01) | |
| *H04L 12/781* | (2013.01) | |
| *H04L 9/40* | (2022.01) | |
| *H04L 12/741* | (2013.01) | |
| *H04L 101/659* | (2022.01) | |

(52) U.S. Cl.
CPC ...... *H04L 63/0236* (2013.01); *H04L 63/0442* (2013.01); *H04L 63/0876* (2013.01); *H04L 2101/659* (2022.05)

(58) Field of Classification Search
None
See application file for complete search history.

(56) References Cited

U.S. PATENT DOCUMENTS

| | | | |
|---|---|---|---|
| 7,079,499 B1 * | 7/2006 | Akhtar .................. | H04L 67/306 |
| | | | 370/310 |
| 11,240,200 B1 * | 2/2022 | Vasquez .................. | H04L 9/006 |

(Continued)

FOREIGN PATENT DOCUMENTS

| | | |
|---|---|---|
| CN | 109274644 A | 1/2019 |
| CN | 110392128 A | 10/2019 |
| CN | 110493367 A | 11/2019 |

OTHER PUBLICATIONS

Integrating Identity Based Cryptography with Cryptographically Generated Addresses in Mobile IPv6. Cao. (Year: 2007).*

(Continued)

*Primary Examiner* — Venkat Perungavoor
(74) *Attorney, Agent, or Firm* — TraskBritt

(57) ABSTRACT

Embodiments of the present disclosure provide a secure communication method, a client and a non-public server. The secure communication method includes: generating a set of destination addresses of a non-public server based on an IPv6 prefix of the non-public server, and a signature string and a user ID of a client, wherein the signature string is obtained by signing an IPv6 address and the user ID of the client based on a private key of the client; initiating a set of connection request to the non-public server based on a set of communication connections containing the set of destination addresses, for the non-public server to determine a public key corresponding to a user ID based on the user ID in the set of destination addresses, verifying the set of communication connections based on the public key, and establishing communication when the verification of the set of communication connections passes.

7 Claims, 2 Drawing Sheets

Generating a set of destination addresses of a non-public server based on an IPv6 prefix of the non-public server, and a signature string and a user ID of a client, wherein the signature string is obtained by signing an IPv6 address and the user ID of the client based on a private key of the client ⟶ 110

Initiating a set of connection request to the non-public server based on a set of communication connections containing the set of destination addresses, for the non-public server to determine a public key corresponding to a user ID based on the user ID in the set of destination addresses, verifying the set of communication connections based on the public key, and establishing communication when the verification of the set of communication connections passes ⟶ 120

(56) References Cited

U.S. PATENT DOCUMENTS

| | | | |
|---|---|---|---|
| 2011/0004766 A1* | 1/2011 | Camarillo | G06F 21/33 |
| | | | 713/176 |
| 2013/0227165 A1* | 8/2013 | Liu | H04L 67/1027 |
| | | | 709/238 |
| 2015/0067027 A1* | 3/2015 | Liu | H04L 69/22 |
| | | | 709/227 |
| 2016/0323422 A1 | 11/2016 | Carter-Schwendler et al. | |
| 2017/0366503 A1* | 12/2017 | Lee | H04L 65/1036 |

OTHER PUBLICATIONS

Trustworthy Communication Mechanism Based on IPv6 Real-Name Address Resource PKI .Chen (Year: 2010).*

Secure Email System Based on True 1Pv6 Address Access .Meng. IEEE. (Year: 2015).*

Implementation of IPv6 Address Generation Mechanism for Enterprise Wireless Local Area Network in Open Source DHCPv6 . Hakiem. IEEE. (Year: 2010).*

Chinese Search Report from Chinese Application No. 202010137103.8, dated Dec. 22, 2020, 2 pages.

Gao et al., "IPv6 routing lookup algorithm based on hierarchical Hash," Computer Engineering and Design, vol. 31(22), (Feb. 2010) pp. 4790-4793.

Yi et al., "FlowLAN: A non-tunneling distributed virtual network based on IPv6," 2016 IEEE Information Technology, Networking, Electronic and Automation Control Conference, Chongqing, China (2016) pp. 229-234.

* cited by examiner

SECURE COMMUNICATION METHOD, CLIENT AND NON-PUBLIC SERVER

CROSS-REFERENCE TO RELATED APPLICATION

The present application claims priority to Chinese Patent Application Serial No. 2020101371038 filed on Mar. 2, 2020, titled "Secure Communication Method, Client and Non-Public Server," the disclosure of which is hereby incorporated herein by this reference in its entirety.

TECHNICAL FIELD

The present disclosure relates to the technical field of the Internet, in particular, to a secure communication method, a client and a non-public server.

BACKGROUND

As the core technology of a next-generation Internet, IPv6 is entering the stage of large-scale commercial applications and is being deployed more and more widely all over the world.

Security issues are taken as an important topic related to the Internet, and how to ensure the security of IPv6 communications and prevent hackers from scanning, infiltrating, and attacking are still pressing issues for people in the field, especially during the rapid development of today's Internet-based Internet of Things, e-commerce, financial services and other businesses with high confidentiality and security requirements.

BRIEF SUMMARY

Embodiments of the present disclosure provide a secure communication method, a client and a non-public server so as to solve the security issue of IPv6 communication.

In a first aspect, an embodiment of the present disclosure provides a secure communication method, including:
  generating a set of destination addresses of a non-public server based on an IPv6 prefix of the non-public server, and a signature string and a user ID of a client, wherein the signature string is obtained by signing an IPv6 address and the user ID of the client based on a private key of the client;
  initiating a set of connection request to the non-public server based on a set of communication connections containing the set of destination addresses, for the non-public server to determine a public key corresponding to a user ID based on the user ID in the set of destination addresses, verifying the set of communication connections based on the public key, and establishing communication when the verification of the set of communication connections passes.

In an embodiment, the generating a set of destination addresses of a non-public server based on an IPv6 prefix of the non-public server, and a signature string and a user ID of a client includes:
  splitting the signature string into a set of signature string sub-blocks; and
  generating a set of destination addresses of the non-public server based on the IPv6 prefix of the non-public server, the user ID and the set of signature string sub-blocks.

In an embodiment, the initiating a set of connection request to the non-public server based on a set of communication connections containing the set of destination addresses includes:
  generating a set of communication connections based on the set of destination addresses of the non-public server; and
  initiating a connection request to the non-public server based on the set of communication connections.

In a second aspect, an embodiment of the present disclosure provides a secure communication method, including:
  determining a public key corresponding to a user ID based on the user ID in a set of destination addresses of a set of communication connections when the set of communication connections used to request a connection is monitored, wherein the set of destination addresses is generated based on an IPv6 prefix of a non-public server, and a signature string and the user ID of a client, and the signature string is obtained by signing an IPv6 address and the user ID of the client based on a private key of the client; and
  verifying the set of communication connections based on the public key, and establishing communication when the verification of the set of communication connections passes.

In an embodiment, when there are multiple communication connections in the set of communication connections, the verifying the set of communication connections based on the public key includes:
  extracting signature string sub-blocks in the destination address of each communication connection and combining the signature string sub-blocks into a restored signature string;
  decrypting the restored signature string based on the public key to obtain a decrypted IPv6 address and a decrypted user ID;
  verifying any communication connection based on the decrypted IPv6 address and the decrypted user ID, as well as a source address and a user ID in any communication connection; and
  when the verification of each communication connection passes, determining that the verification of the set of communication connections passes; otherwise, determining that the verification of the set of communication connections fails.

In an embodiment, before the determining a public key corresponding to a user ID based on the user ID in a set of destination addresses of a set of communication connections when the set of communication connections used to request a connection is monitored, the communication method further includes:
  communicating with an access device based on a preset non-routing address, so that the access device directs the IPv6 prefix of the non-public server to the non-public server.

In a third aspect, an embodiment of the present disclosure provides a client, including:
  a destination address generator configured to generate a set of destination addresses of a non-public server based on an IPv6 prefix of the non-public server, and a signature string and a user ID of a client, wherein the signature string is obtained by signing an IPv6 address and the user ID of the client based on a private key of the client; and
  a communication connection requester configured to initiate a set of connection request to the non-public server based on a set of communication connections containing the set of destination addresses, for the non-public server to determine a public key corresponding to a user ID based on the user ID in the set of destination addresses, verify the set of communication connections based on the public key and establish communication when the verification of the set of communication connections passes.

In a fourth aspect, an embodiment of the present disclosure provides a non-public server, including:
- a public key determiner configured to determine a public key corresponding to a user ID based on the user ID in a set of destination addresses of a set of communication connections when the set of communication connections used to request a connection is monitored, wherein the set of destination addresses is generated based on an IPv6 prefix of a non-public server, and a signature string and the user ID of a client, and the signature string is obtained by signing an IPv6 address and the user ID of the client based on a private key of the client; and
- a decryption verifier configured to verify the set of communication connections based on the public key and establish communication when the verification of the set of communication connections passes.

In a fifth aspect, an embodiment of the present disclosure provides an electronic device, including a processor, a communication interface, a memory, and a bus. The processor, the communication interface and the memory communicate with each other through the bus; and the processor may call logical commands in the memory to perform the methods according to the first and second aspects.

In a sixth aspect, an embodiment of the present disclosure provides a non-transitory computer-readable storage medium storing computer programs, and the computer programs are executed by a processor to perform the methods according to the first and second aspects.

In the secure communication method, the client and the non-public server according to embodiments of the present disclosure, the client uses a private key to sign the IPv6 address and user ID of the client to construct a set of communication connections. The non-public server verifies the legality of the communication connections based on the public key so as to ensure that the non-public server can respond to the request from a client anywhere on the IPv6 Internet and communicate with the client, while other clients fail to perceive the existence of the non-public server at all, thereby preventing hackers from scanning, infiltrating and attacking, which greatly enhances the security of the client and server.

BRIEF DESCRIPTION OF THE DRAWINGS

In order to more clearly illustrate the technical solutions disclosed in the embodiments of the present disclosure or the prior art, drawings needed in the descriptions of the embodiments or the prior art will be briefly described below. Obviously, the drawings in the following description are only some of the embodiments of the present disclosure, and other drawings can be obtained according to these drawings without any creative effort for those skilled in the art.

DETAILED DESCRIPTION

In order to illustrate the objectives, technical solutions and advantages of the embodiments of the present disclosure clearly, the technical solutions in the embodiments of the present disclosure will be described clearly and completely in conjunction with the accompanying drawings in the embodiments of the present disclosure. Obviously, the described embodiments are part of the embodiments of the present disclosure, rather than all of the embodiments. All other embodiments obtained by a person of ordinary skill in the art based on the embodiments of the present disclosure without any creative effort fall within the protection scope of the present disclosure.

Figure 1:
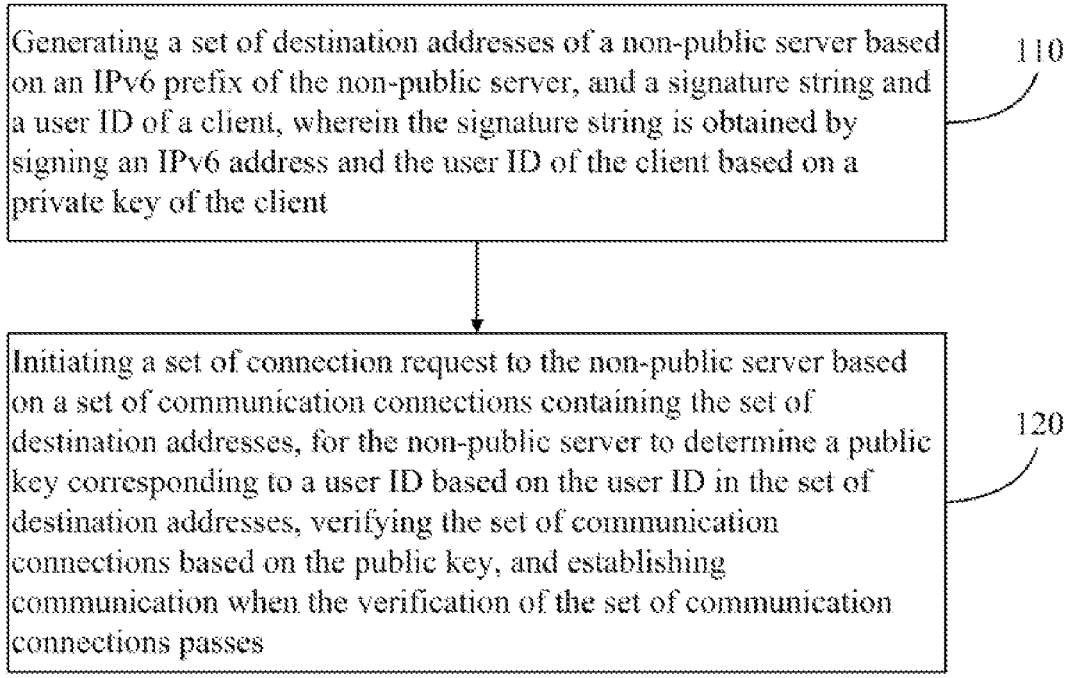
FIG. 1 is a schematic flowchart of a secure communication method according to an embodiment of the present disclosure.

FIG. 1 is a schematic flowchart of a secure communication method according to an embodiment of the present disclosure. As shown in FIG. 1, the method is performed by any client in an IPV6 network. The secure communication method includes:

Step 110: generating a set of destination addresses of a non-public server based on an IPv6 prefix of the non-public server, and a signature string and a user ID of a client, wherein the signature string is obtained by signing an IPv6 address and the user ID of the client based on a private key of the client.

In an embodiment, for any client, if the client needs to communicate with a non-public server, the IPv6 prefix of the non-public server, as well as the client's own signature string and user ID are determined.

The non-public server does not use a fixed IPv6 address to provide external services, but monitors relevant service ports of all addresses under its IPv6 prefix after accessing the network, so as to hide the real address used by the non-public server in a huge address pool, making it imperceptible from the outside, thereby ensuring the security and reliability of the non-public server.

The signature string of the client is obtained by signing and encrypting an IPv6 address and the user ID of the client based on a private key of the client. Here, the private key of the client and its corresponding public key are pre-constructed based on PKI (Public Key Infrastructure). Each client corresponds to a set of private and public keys. The private key is kept by the user and kept strictly confidential, while the public key is publicly released. In addition, the user ID of the client is used to identify identity information of the client.

It should be noted that, in the embodiments of the present disclosure, the public and private keys of any client may be determined by a PKI system, or directly generated by the client with the public key being synchronized to a server in a trusted domain.

A set of addresses of a non-public server generated based on an IPv6 prefix of the non-public server, and a signature string and a user ID of a client may be used as a set of destination addresses for the client to initiate a connection request to the private server. Here, a set of destination addresses may include one or more destination addresses.

Step 120: initiating a set of connection request to the non-public server based on a set of communication connections containing the set of destination addresses, for the non-public server to determine a public key corresponding to a user ID based on the user ID in the set of destination addresses, verifying the set of communication connections based on the public key, and establishing communication when the verification of the set of communication connections passes.

In an embodiment, a set of destination addresses corresponds to a set of communication connections, wherein each destination address corresponds to one communication connection. A set of communication connections is used to initiate a set of connection requests. Each communication connection may be in a five-tuple form. The five-tuple contains a source address, a source port, a destination address, a destination port, and a transport layer protocol. The source address is the IPv6 address of the client, the destination address is one of the set of destination addresses obtained in step 120. A set of connection requests may be initiated to the non-public server based on the communication connection after the parameters of the communication connection are obtained.

The non-public server monitors related service ports of all addresses under its IPv6 prefix. When the non-public server monitors a set of communication connections of the client, it extracts the user ID of the client from a set of destination addresses of the communication connection and obtains the public key under the PKI system corresponding to the user ID based on the user ID. After the public key is obtained, the non-public server applies the public key to decrypt the restored signature string composed based on the set of destination addresses, and compares the decrypted IPv6 address and user ID of the client with the source address and the user ID contained in the communication connection to verify the legality of the communication connection. When the decrypted IPv6 address and user ID of the client are consistent with the source address and the user ID contained in each communication connection of the set of communication connections, the communication connection is determined to be legal, the verification passes and the non-public server establishes a connection with the client, and thus the secure communication between the non-public server and the client is provided; otherwise, the set of communication connections is determined to be illegal, the verification fails, and the non-public server does not communicate with the client, so as to maintain the security of the non-public server.

In the method according to the embodiments of the present disclosure, the client uses a private key to sign the IPv6 address and the user ID of the client to construct a set of communication connections. The non-public server verifies the legality of the communication connections based on the public key so as to ensure that the non-public server can respond to the request from a client anywhere on the IPv6 Internet and communicate with the client, while other clients fail to perceive the existence of the non-public server at all, thereby preventing hackers from scanning, infiltrating, and attacking, which greatly enhances the security of the client and server.

Based on the foregoing embodiments, step 110 includes:
  step 111: splitting the signature string into a set of signature string sub-blocks; and
  step 112: generating a set of destination addresses of the non-public server based on the IPv6 prefix of the non-public server, the user ID and the set of signature string sub-blocks.

In an embodiment, in step 111, the signature string may be split after being obtained. Here, the split rule and the number of splits are preset. Multiple strings can be obtained by splitting the signature string, each string is regarded as a signature string sub-block, and the multiple signature string sub-blocks constitute a set of signature string sub-blocks.

In step 112, the number of destination addresses is consistent with the number of signature string sub-blocks in step 111, and the number of five-tuple communication sets obtained is also consistent with the number of signature string sub-blocks. Each signature string sub-block corresponds to one destination address, and any destination address includes three parts: the IPv6 prefix, the user ID and the signature string sub-block. It should be noted that, for any destination address, the user ID and the signature string sub-block in the destination address constitute the IPv6 suffix of the destination address.

In the method according to the embodiments of the present disclosure, the signature string is split into a set of signature string sub-blocks for generating a set of destination addresses, thereby further enhancing the security of the communication connection.

Based on any foregoing embodiment, step 120 includes:
  step 121: generating a set of communication connections based on the set of destination addresses of the non-public server; and
  step 122: initiating a connection request to the non-public server based on the set of communication connections.

In an embodiment, after multiple destination addresses are obtained, a communication connection is generated for each destination address, thereby obtaining multiple communication connections to form a set of communication connections. A connection request is initiated to the non-public server based on the set of communication connections, such that the non-public server monitors a set of communication connections, may decrypt the restored signature string composed of the signature string sub-blocks of each destination address in a set of communication connections based on the public key corresponding to the user ID, and compares the IPv6 address and the user ID of the client obtained by decryption with the source address and the user ID contained in the communication connection to verify the legality of the communication connection.

In the method according to the embodiment of the present disclosure, by sending a set of communication connections to a non-public server, the non-public server needs to verify the legality of all communication connections and then establishes a connection between the client and the non-public server, which enhances the security of communication between the client and the non-public server.

Figure 2:
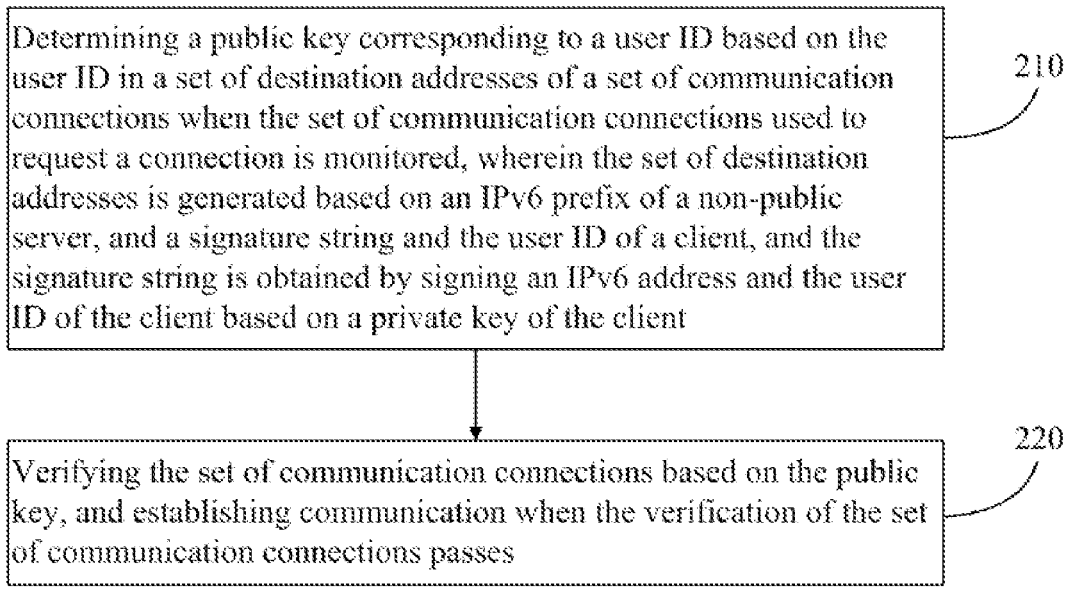
FIG. 2 is a schematic flowchart of a secure communication method according to another embodiment of the present disclosure.

Based on any of the foregoing embodiments, FIG. 2 is a schematic flowchart of a secure communication method according to another embodiment of the present disclosure. As shown in FIG. 2, the method is performed by an IPV6 non-public server. The secure communication method includes:
  Step 210: determining a public key corresponding to a user ID based on the user ID in a set of destination addresses of a set of communication connections when the set of communication connections used to request a connection is monitored, wherein the set of destination addresses is generated based on an IPv6 prefix of a non-public server, and a signature string and the user ID of a client, and the signature string is obtained by signing an IPv6 address and the user ID of the client based on a private key of the client.

In an embodiment, the non-public server monitors related service ports of all addresses under its IPv6 prefix, and when a set of communication connections for a connection request from any client are monitored, the non-public server extracts the user ID of the client from a set of destination addresses of the communication connection and determines the public key corresponding to the user ID. Here, the public key may be obtained through a PKI system, or by matching based on a large number of user IDs and their corresponding public keys pre-stored in the server, which is not specifically defined in the embodiment of the present disclosure. It should be noted that a set of communication connections includes one or more communication connections. Each communication connection includes one destination address. Prior to this, the client is required to sign and encrypt the IPv6 address and the user ID of the client based on the private key to obtain a signature string, generate a set of destination addresses based on the IPv6 prefix of the non-public server to be connected and the signature string and the user ID of the client, obtain a set of communication connections containing a set of destination addresses, and initiate a connection request based on the set of communication connections.

Step 220: verifying the set of communication connections based on the public key, and establishing communication when the verification of the set of communication connections passes.

In an embodiment, the legality of a set of communication connections may be verified based on the public key after the public key is obtained. Further, the public key may be applied to decrypt the restored signature string composed based on the set of destination addresses of the communication connections, and the IPv6 address and the user ID of the client obtained by decryption are compared with the source address and the user ID contained in the communication connection to verify the legality of the communication connection. When the IPv6 address and the user ID of the client obtained by decryption are consistent with the source address and the user ID contained in the communication connection, the communication connection is determined to be legal, the verification passes and a communication connection with the client is established, and thus the secure communication between the non-public server and the client is provided; otherwise, the set of communication connections is determined to be illegal, the verification fails, and the non-public server does not communicate with the client, so as to maintain the security of the non-public server.

In the method according to the embodiments of the present disclosure, the client uses a private key to sign the IPv6 address and user ID of the client to construct a set of communication connections. The non-public server verifies the legality of the communication connections based on the public key so as to ensure that the non-public server can respond to the request from a client anywhere on the IPv6 Internet and communicate with the client, while other clients fail to perceive the existence of the non-public server at all, thereby preventing hackers from scanning, infiltrating, and attacking, which greatly enhances the security of the client and server.

Based on any of the foregoing embodiments, when there are multiple communication connections in a set of communication connections, step 220 includes:

Step 221: extracting IPv6 suffixes of a set of destination addresses of each communication connection and combining the IPv6 suffixes into a restored signature string.

In an embodiment, on the client side, the client splits the signature string into multiple signature string sub-blocks in advance, and generates a destination address for each signature string sub-block, thereby obtaining one communication connection and thus obtaining a set of communication connections containing multiple communication connections.

Therefore, when the public key is applied to verify the legality of multiple communication connections, it is necessary to implement the restoration of the signature string based on the signature string sub-block of the destination address in the multiple communication connections. It should be noted that the way in which the signature string is restored based on the signature string sub-block in each destination address corresponds to the way in which the client splits the signature string into multiple signature string sub-blocks. That is, both of the ways are pre-agreed by the client and the non-public server, and are not specifically defined in the embodiment of the present disclosure.

Further, the signature string restored from the signature string sub-block of the destination address of each communication connection is recorded as the restored signature string in the embodiment of the present disclosure, so as to distinguish it from the signature string generated on the client side.

Step 222: decrypting the restored signature string based on the public key to obtain a decrypted IPv6 address and a decrypted user ID.

In an embodiment, after the restored signature string is obtained, the restored signature string is decrypted based on the public key, and the decrypted IPv6 address and the decrypted user ID are extracted from the decrypted restored signature string. Here, the decrypted IPv6 address is the IPv6 address of the client extracted from the decrypted restoration signature string, and the decrypted user ID is the user ID of the client extracted from the decrypted restored signature string.

Step 223: verifying any communication connection based on the decrypted IPv6 address and the decrypted user ID, as well as a source address and a user ID in any communication connection.

In an embodiment, for any communication connection in a set of communication connections, the decrypted IPv6 address may be compared with the source address in the communication connection, and the decrypted user ID may be compared with the user ID in the destination address of the communication connection. If they are consistent, it is determined that the verification of the communication connection passes; otherwise, it is determined that the verification of the communication connection fails.

Step 224: when the verification of each communication connection passes, determining that the verification of the set of communication connections passes; otherwise, determining that the verification of the set of communication connections fails.

In an embodiment, after the verification is completed for each communication connection in the set of communication connections, if the verification of each communication connection in the set of communication connections passes, it is determined that the set of communication connections is legal, the verification passes, and the connection with the client is established. If the verification of at least one communication connection in the set of communication connections fails, it is determined that the set of communication connections is illegal and the verification fails, and the non-public server does not connect and communicate with the client, so as to maintain the security of the non-public server.

In the method according to the embodiments of the present disclosure, by restoring the signature string, the legality of each communication connection is verified and then a connection between the client and the non-public server is established, which enhances the security of communication between the client and the non-public server.

Based on any of the foregoing embodiments, before step 210, the method further includes: communicating with an access device based on a preset non-routing address, so that the access device directs the IPv6 prefix of the non-public server to the non-public server.

In an embodiment, before performing the above-mentioned secure communication method, it is also necessary to initialize the non-public server when the non-public server accesses the network, so as to ensure that the non-public server is able to monitor the related service ports of all addresses under its IPv6 prefix. Wherein the access device refers to the access router or other types of access devices connected to the non-public server. When the non-public server needs to communicate with the access device, the above-mentioned non-routing address is used for communication to ensure that non-routing addresses outside the subnet cannot be sensed.

Based on any of the foregoing embodiments, a secure communication method is provided, including the following steps:

Firstly, initializing the non-public server: configuring a non-routing address, e.g., fe80:3300 for the non-public server; and configuring the access device connected to the non-public server with a non-global unicast IPv6 address, e.g., fe80:2203. When the non-public server needs to communicate with the access device, it needs to use the address for communication.

In addition, necessarily, configuring a public IPv6 prefix, e.g., 2001:da8:c0b2:3388:/64 for the non-public servers; at the same time, conducting related routing configuration to ensure that data messages on the Internet directing to the prefix may be routed to the non-public server, and data messages sent by the router may be sent to the Internet.

Furthermore, registering, by the client, with the authority to obtain an asymmetrically encrypted encryption private key, and saving the user ID of the client, e.g., ccbb.

When the client starts to communicate with the non-public server, it firstly obtains its own IPv6 address 2001:250:c337:2481:3 as the source address of this communication, and at the same time obtains the IPv6 prefix 2001:da8:c0b2:3388:/64 of the non-public server.

The client uses the private key of its own asymmetric encryption algorithm to sign the IPv6 address and user ID simultaneously used, generates a signature string, and splits the signature string to form multiple signature string sub-blocks. Here, the number of generated signature string sub-blocks is determined by the encryption algorithm. It is assumed that the number of IPv6 prefixes generated in the embodiment of the present disclosure is 5. In addition, in order to prevent replay attacks, a non-repetitive verifiable random factor can also be added between different communication processes during encryption. Through the method, the client generates five signature string sub-blocks:

2087:3239:1e07
3eaf:6ce9:2058
4376:523b:fe09
1628:2573:6689
2a73:56b8:22ce

The client combines these five signature string sub-blocks with the IPv6 prefixes of the non-public server and the client's own user ID to generate five IPv6 destination addresses as a set of IPv6 destination addresses:

2001:da8:c0b2:3388:ccbb:2087:3239:1e07
2001:da8:c0b2:3388:ccbb:3eaf:6ce9:2058
2001:da8:c0b2:3388:ccbb:4376:523b:fe09
2001:da8:c0b2:3388:ccbb:1628:2573:6689
2001:da8:c0b2:3388:ccbb:2a73:56b8:22ce The client uses 2001:250:c337:2481:3 as the source address, and the five addresses above as the destination addresses to initiate a set of five communication connections to the non-public server at the same time.

The non-public server monitors the corresponding service ports of all addresses under the prefix 2001:da8:c0b2:3388:/64 by default. When the non-public server receives the above communication connection, the non-public server first extracts the user ID ccbb of the client, and obtains the public key for decryption from the directory server of the authority through the PKI system according to the user ID.

Immediately, the non-public server verifies the restored signature string combined from the five destination addresses in the above-mentioned set of communication connections by means of the public key. If it is legal, the data messages are released, and the above-mentioned communication connection is allowed to be established and information is transmitted, and the formal communication process is started; otherwise, the communication connection is considered illegal.

In the method according to the embodiments of the present disclosure, the client uses a private key to sign the IPv6 address and user ID of the client to construct a set of communication connections. The non-public server verifies the legality of the communication connections based on the public key so as to ensure that the non-public server can respond to the request from a client anywhere on the IPv6 Internet and communicate with the client, while other clients fail to perceive the existence of the non-public server at all, thereby preventing hackers from scanning, infiltrating, and attacking, which greatly enhances the security of the client and server. Any of the above embodiments can be applied but not limited to virtual machine management of cloud computing, private cloud applications, Internet of things sensors, controllers and other fields.

Figure 3:
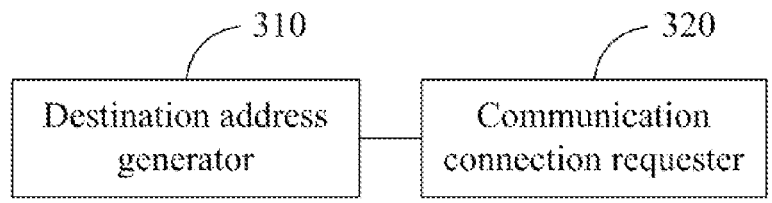
FIG. 3 is a schematic structural diagram of a client according to an embodiment of the present disclosure.

Based on any of the foregoing embodiments, FIG. 3 is a schematic structural diagram of a client according to an embodiment of the present disclosure. As shown in FIG. 3, the client includes:

a destination address generator 310 and a communication connection requester 320;

wherein the destination address generator 310 is configured to generate a set of destination addresses of a non-public server based on an IPv6 prefix of the non-public server, and a signature string and a user ID of a client, wherein the signature string is obtained by signing an IPv6 address and the user ID of the client based on a private key of the client; and the communication connection requester 320 is configured to initiate a set of connection request to the non-public server based on a set of communication connections containing the set of destination addresses, for the non-public server to determine a public key corresponding to a user ID based on the user ID in the set of destination addresses, verify the set of communication connections based on the public key and establish communication when the verification of the set of communication connections passes.

In the client according to the embodiments of the present disclosure, the client uses a private key to sign the IPv6 address and user ID of the client to construct a set of communication connections. The non-public server verifies the legality of the communication connections based on the public key so as to ensure that the non-public server can respond to the request from a client anywhere on the IPv6 Internet and communicate with the client, while other clients fail to perceive the existence of the non-public server at all, thereby preventing hackers from scanning, infiltrating, and attacking, which greatly enhances the security of the client and server.

Based on any of the foregoing embodiments, the destination address generator 310 includes:
- a splitting subunit configured to split the signature string into a set of signature string sub-blocks; and
- an address generation subunit configured to generate a set of destination addresses of the non-public server based on the IPv6 prefix of the non-public server, and the user ID and the set of signature string sub-blocks.

Based on any of the foregoing embodiments, the communication connection requester 320 is configured to:
- generate a set of communication connections based on the set of destination addresses of the non-public server; and
- initiate a connection request to the non-public server based on the set of communication connections.

Figure 4:
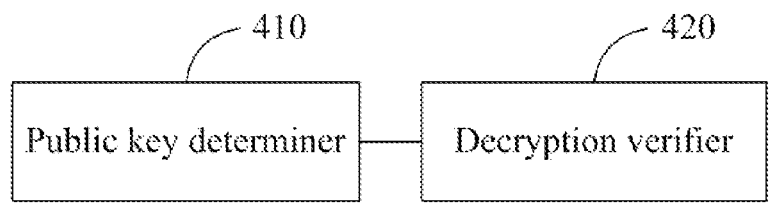
FIG. 4 is a schematic structural diagram of a non-public server according to an embodiment of the present disclosure.

Based on any of the foregoing embodiments, FIG. 4 is a schematic structural diagram of a non-public server according to an embodiment of the present disclosure. As shown in FIG. 4, the non-public server includes:
- a public key determiner 410 and a decryption verifier 420;
- wherein the public key determiner 410 is configured to determine a public key corresponding to a user ID based on the user ID in a set of destination addresses of a set of communication connections when the set of communication connections used to request a connection is monitored, wherein the set of destination addresses is generated based on an IPv6 prefix of a non-public server, and a signature string and the user ID of a client, and the signature string is obtained by signing an IPv6 address and the user ID of the client based on a private key of the client; and
- the decryption verifier 420 is configured to verify the set of communication connections based on the public key and establish communication when the verification of the set of communication connections passes.

The non-public server according to the embodiment of the present disclosure verifies the legality of the communication connections based on the public key so as to ensure that the non-public server can respond to the request from a client anywhere on the IPv6 Internet and communicate with the client, while other clients fail to perceive the existence of the non-public server at all, thereby preventing hackers from scanning, infiltrating, and attacking, which greatly enhances the security of the client and server.

Based on any of the foregoing embodiments, when there are multiple communication connections in a set of communication connections, the decryption verifier 420 is configured to:
- extract signature string sub-blocks in the destination address of each communication connection and combine the signature string sub-blocks into a restored signature string;
- decrypt the restored signature string based on the public key to obtain a decrypted IPv6 address and a decrypted user ID;
- verify any communication connection based on the decrypted IPv6 address and the decrypted user ID, as well as a source address and a user ID in any communication connection; and
- when the verification of each communication connection passes, determine that the verification of the set of communication connections passes; otherwise, determine that the verification of the set of communication connections fails.

Based on any of the foregoing embodiments, the non-public server further includes an initializer configured to:
- communicate with an access device based on a preset non-routing address, so that the access device directs the IPv6 prefix of the non-public server to the non-public server.

Figure 5:
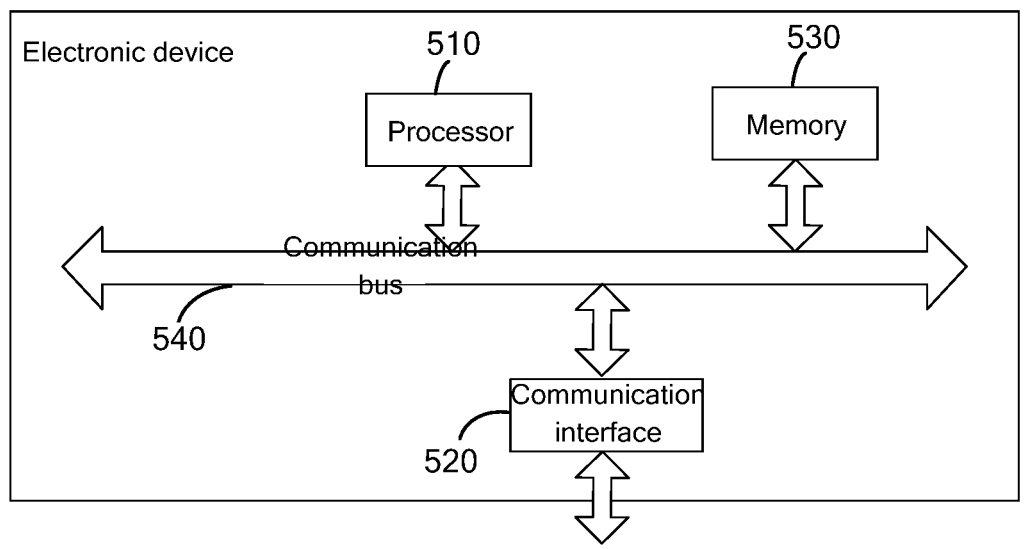
FIG. 5 is a schematic structural diagram of an electronic device according to an embodiment of the present disclosure.

FIG. 5 is a schematic diagram of an electronic device according to an embodiment of the present disclosure. As shown in FIG. 5, the electronic device may include a processor 510, a communication interface 520, a memory 530, and a communication bus 540. The processor 510, the communication interface 520, and the memory 530 communicate with each other through the communication bus 540. The processor 510 may call the logical commands in the memory 530 to perform the following method: generating a set of destination addresses of a non-public server based on an IPv6 prefix of the non-public server, and a signature string and a user ID of a client, wherein the signature string is obtained by signing an IPv6 address and the user ID of the client based on a private key of the client; initiating a set of connection request to the non-public server based on a set of communication connections containing the set of destination addresses, for the non-public server to determine a public key corresponding to a user ID based on the user ID in the set of destination addresses, verifying the set of communication connections based on the public key, and establishing communication when the verification of the set of communication connections passes.

In addition, the processor 510 may also call logical commands in the memory 530 to perform the following method: determining a public key corresponding to a user ID based on the user ID in a set of destination addresses of a set of communication connections when the set of communication connections used to request a connection is monitored, wherein the set of destination addresses is generated based on an IPv6 prefix of a non-public server, and a signature string and the user ID of a client, and the signature string is obtained by signing an IPv6 address of the client and the user ID based on a private key of the client; and verifying the set of communication connections based on the public key, and establishing communication when the verification of the set of communication connections passes.

In addition, the logical commands in the memory 530 may be implemented in the form of a software functional unit and may be stored in a computer readable storage medium while being sold or used as a separate product. Based on such understanding, the technical solution of the present disclosure or a part of the technical solution, which is essential or contributes to the prior art, may be embodied in the form of a software product, which is stored in a storage medium, including several instructions to cause a computer device (which may be a personal computer, server, or network device, etc.) to perform all or part of the steps of the methods described in various embodiments of the present disclosure. The storage medium described above includes: a U disk, a mobile hard disk, a read-only memory (ROM), a random access memory (RAM), a magnetic disk, or a compact disk, and the like.

An embodiment of the present disclosure also provides a non-transitory computer-readable storage medium storing computer programs. The computer programs are implemented when executed by a processor to perform the methods according to the foregoing embodiments, for example, including: generating a set of destination addresses of a non-public server based on an IPv6 prefix of the non-public server, and a signature string and a user ID of a client, wherein the signature string is obtained by signing an IPv6 address and the user ID of the client based on a private key of the client; initiating a set of connection request to the non-public server based on a set of communication connections containing the set of destination addresses, for the non-public server to determine a public key corresponding to a user ID based on the user ID in the set of destination addresses, verifying the set of communication connections based on the public key, and establishing communication when the verification of the set of communication connections passes.

An embodiment of the present disclosure also provides a non-transitory computer-readable storage medium storing computer programs. The computer programs are implemented when executed by a processor to perform the methods according to the foregoing embodiments, for example, including: determining a public key corresponding to a user ID based on the user ID in a set of destination addresses of a set of communication connections when the set of communication connections used to request a connection is monitored, wherein the set of destination addresses is generated based on an IPv6 prefix of a non-public server, and a signature string and the user ID of a client, and the signature string is obtained by signing an IPv6 address of the client and the user ID based on a private key of the client; and verifying the set of communication connections based on the public key, and establishing communication when the verification of the set of communication connections passes.

The device embodiments described above are merely illustrative, wherein the units described as separate components may or may not be physically separate, and the components displayed as units may or may not be physical units, that is, may be located at the same place, or may be distributed to multiple network units. Some or all of the modules may be selected according to actual needs to achieve the purpose of the solution of the embodiments. Those of ordinary skill in the art can understand and implement the embodiments described above without paying creative labors.

Through the description of the embodiments above, those skilled in the art can clearly understand that the various embodiments can be implemented by means of software and a necessary general hardware platform, and of course, by hardware. Based on such understanding, the technical solution of the present disclosure or a part of the technical solution, which is essential or contributes to the prior art, may be embodied in the form of a software product, which is stored in a storage medium such as ROM/RAM, magnetic discs, compact discs, etc., including several instructions to cause a computer device (which may be a personal computer, server, or network device, etc.) to perform various embodiments or a part of the methods described in various embodiments.

It should be noted that the above embodiments are only used to explain the technical solutions of the present disclosure, and are not limited thereto; although the present disclosure is described in detail with reference to the foregoing embodiments, it should be understood by those skilled in the art that they can still modify the technical solutions described in the foregoing embodiments and make equivalent substitutions to a part of the technical features and these modifications and substitutions do not depart from the spirit and scope of the technical solutions of the embodiments of the present disclosure.

What is claimed is:

1. A secure communication method, comprising:
   generating a set of destination addresses of a non-public server based on an IPv6 prefix of the non-public server and a signature string and a user ID of a client, wherein the signature string is obtained by signing an IPv6 address and the user ID of the client based on a private key of the client; and
   initiating a set of connection request to the non-public server based on a set of communication connections containing the set of destination addresses, for the non-public server to determine a public key corresponding to a user ID based on the user ID in the set of destination addresses, verifying the set of communication connections based on the public key, and establishing communication when the verification of the set of communication connections passes.

2. The secure communication method of claim 1, wherein the generating a set of destination addresses of a non-public server based on an IPv6 prefix of the non-public server, and a signature string and a user ID of a client comprises:
   splitting the signature string into a set of signature string sub-blocks; and
   generating a set of destination addresses of the non-public server based on the IPv6 prefix of the non-public server, the user ID and the set of signature string sub-blocks.

3. The secure communication method of claim 2, wherein the initiating a set of connection request to the non-public server based on a set of communication connections containing the set of destination addresses comprises:
   generating a set of communication connections based on the set of destination addresses of the non-public server; and
   initiating a connection request to the non-public server based on the set of communication connections.

4. A client, comprising:
   a destination address generator configured to generate a set of destination addresses of a non-public server based on an IPv6 prefix of the non-public server, and a signature string and a user ID of a client, wherein the signature string is obtained by signing an IPv6 address and the user ID of the client based on a private key of the client; and
   a communication connection requester configured to initiate a set of connection request to the non-public server based on a set of communication connections containing the set of destination addresses, for the non-public server to determine a public key corresponding to a user ID based on the user ID in the set of destination addresses, verify the set of communication connections based on the public key, and establish communication when the verification of the set of communication connections passes.

5. A non-public server, comprising:
   a public key determiner configured to determine a public key corresponding to a user ID based on the user ID in a set of destination addresses of a set of communication connections when the set of communication connections used to request a connection is monitored, wherein the set of destination addresses is generated based on an IPv6 prefix of a non-public server and a signature string and the user ID of a client, and the signature string is obtained by signing an IPv6 address and the user ID of the client based on a private key of the client; and
   a decryption verifier configured to verify the set of communication connections based on the public key and establish communication when the verification of the set of communication connections passes.

6. The non-public server of claim 5, further comprising a decryption verifier configured to:

extract signature string sub-blocks in a destination address of each communication connection and combine the signature string sub-blocks into a restored signature string; wherein the signature string sub-blocks are obtained by splitting the signature string by the client;

decrypt the restored signature string based on the public key to obtain a decrypted IPv6 address and a decrypted user ID;

verify any communication connection based on the decrypted IPv6 address and the decrypted user ID, as well as a source address and a user ID in any communication connection; and when the verification of each communication connection passes, determine that the verification of the set of communication connections passes; otherwise, determine that the verification of the set of communication connections fails.

7. The non-public server of claim 5, further comprising:

an initializer configured to communicate with an access device based on a preset non-routing address, so that the access device directs the IPv6 prefix of the non-public server to the non-public server.

\* \* \* \* \*